US00RE50070E

(19) United States
(12) Reissued Patent
Ma

(10) Patent Number: US RE50,070 E
(45) Date of Reissued Patent: Aug. 6, 2024

(54) MAGNETIC LAMP

(71) Applicant: Shenzhen City Donglin High-Tech Co., Ltd., Shenzhen (CN)

(72) Inventor: Zenan Ma, Shenzhen (CN)

(73) Assignee: Shenzhen City Donglin High-Tech Co., Ltd., Shenzhen (CN)

(21) Appl. No.: 29/873,430

(22) Filed: Mar. 31, 2023

Related U.S. Patent Documents

Reissue of:
(64) Patent No.: Des. 917,091
Issued: Apr. 20, 2021
Appl. No.: 29/677,990
Filed: Jan. 25, 2019

(51) LOC (14) Cl. ..... 26-04
(52) U.S. Cl.
USPC ..... D26/76
(58) Field of Classification Search
USPC ..... D26/1, 2, 24, 37, 60, 61, 63, 65, 67, 71, D26/72, 85, 89, 93, 94, 98, 99, 106, 111, D26/118, 119, 125
CPC ..... F21S 2/00; F21S 9/02; F21S 9/03; F21S 9/032; F21S 9/035; F21S 6/00; F21S 10/00; F21S 10/007; F21S 10/02; F21S 10/046; F21S 8/02; F21S 8/03; F21S 8/04; F21V 7/0058; F21V 21/30
See application file for complete search history.

(56) References Cited

U.S. PATENT DOCUMENTS

D123,048 S 10/1940 Doane
D123,887 S 12/1940 Koehler
D166,093 S 3/1952 McPhail
D175,188 S 7/1955 Phillips
D191,531 S 10/1961 Spaulding
D203,406 S 1/1966 Wince et al.
D292,322 S 10/1987 Krol
D329,715 S 9/1992 Dieperink
D344,605 S * 2/1994 Aspenwall ..... D26/76
D393,734 S 4/1998 Casteel
D424,732 S 5/2000 Cece
D481,483 S 10/2003 Waugh et al.
D543,651 S 5/2007 Hargreaves
D581,079 S * 11/2008 Mier-Langner ..... D26/72
D606,229 S * 12/2009 Johansen ..... D26/80
D608,043 S * 1/2010 Ko ..... D26/72
D646,003 S * 9/2011 Wang ..... D26/51
D655,854 S 5/2012 Kim et al.
D663,882 S * 7/2012 Muraishi ..... D26/76
D690,844 S * 10/2013 Wang ..... D26/51
D693,047 S * 11/2013 Haumann ..... D26/89
8,608,337 B2 * 12/2013 Nourishad ..... F21S 8/04 362/225
D709,636 S * 7/2014 Murata ..... D26/72
D715,466 S * 10/2014 Wang ..... D26/24
D730,558 S * 5/2015 Dungan ..... D26/76
D735,390 S * 7/2015 Yanping ..... D26/74
D791,383 S * 7/2017 Yu ..... D26/76
D791,997 S * 7/2017 van den Dool ..... D26/76
D800,942 S * 10/2017 Poyrah ..... D26/72
D801,570 S * 10/2017 Grandsart ..... D26/76
9,874,333 B2 * 1/2018 Lay ..... F21S 8/04
D819,878 S * 6/2018 Cerce ..... D26/138
D820,500 S 6/2018 Li et al.
D825,792 S * 8/2018 Johnson ..... D26/24
D858,852 S * 9/2019 Chen ..... D26/76
D859,199 S * 9/2019 Goltche ..... D10/114.4
D860,484 S * 9/2019 Wang ..... D26/24
D861,950 S * 10/2019 Hsu ..... D26/76
D862,766 S * 10/2019 Kim ..... D26/76
D869,048 S * 12/2019 Chai ..... D26/76
D872,339 S * 1/2020 Chen ..... D26/76
D876,700 S * 2/2020 Patterson ..... D26/76
D880,021 S * 3/2020 Meise ..... D26/24
D880,044 S * 3/2020 Chen ..... D26/76
D884,243 S * 5/2020 Li ..... D26/63
D889,722 S * 7/2020 Veltri ..... D26/76
D897,022 S * 9/2020 Guo ..... D26/76
D900,374 S * 10/2020 Luo ..... D26/85
D917,091 S * 4/2021 Ma ..... D26/76
D935,679 S * 11/2021 Yuan ..... D26/76
D935,680 S * 11/2021 Yuan ..... D26/76
D938,087 S * 12/2021 Zou ..... D26/85
D938,640 S * 12/2021 Zou ..... D26/85
D939,756 S * 12/2021 Yuan ..... D26/85
D940,376 S * 1/2022 Yuan ..... D26/85
D945,045 S * 3/2022 Shen ..... D26/85
D945,046 S * 3/2022 Shen ..... D26/85
D965,196 S 9/2022 Johnson
D970,784 S * 11/2022 Ai ..... D26/76
D975,906 S * 1/2023 Li ..... D26/76

| | | | | | |
|---|---|---|---|---|---|
| D984,013 | S | * | 4/2023 | Pan | D26/85 |
| D991,530 | S | * | 7/2023 | Pettit | D26/76 |
| D994,945 | S | * | 8/2023 | Xie | D26/85 |
| D998,851 | S | * | 9/2023 | Xia | D26/85 |
| D1,003,491 | S | * | 10/2023 | Hu | D26/87 |
| D1,006,295 | S | * | 11/2023 | Ghasabi | D26/76 |
| D1,007,739 | S | * | 12/2023 | Zhu | D26/72 |
| D1,011,591 | S | * | 1/2024 | Ma | D26/24 |
| D1,014,819 | S | * | 2/2024 | Barlettano | D26/76 |
| 2007/0127235 | A1 | * | 6/2007 | Cooper | F21L 4/00 362/217.1 |

FOREIGN PATENT DOCUMENTS

| | | | |
|---|---|---|---|
| CN | 303828465 | S | 8/2016 |
| CN | 304195538 | S | 7/2017 |
| CN | 306599486 | S | 6/2021 |
| CN | 307459643 | S | 7/2022 |
| CN | 307596084 | S | 10/2022 |
| CN | 307850009 | S | 2/2023 |
| CN | 307880379 | S | 2/2023 |
| EM | 000365846-0001 | S | 9/2005 |
| EM | 001227060-0001 | S | 8/2010 |
| GB | 9002721241-0003 | S | 7/2015 |
| GB | 6107126 | S | 1/2021 |
| GB | 6221935 | S | 7/2022 |
| JP | 1592875 | S | 12/2017 |
| KR | 30-0255360 | S | 3/2000 |
| KR | 30-0579990 | S | 11/2010 |
| KR | 30-0632367 | S | 3/2012 |

OTHER PUBLICATIONS

"LED Direct Wire Under Cabinet Light in 3000K Soft White." Favorite Monkey., May 28, 2021 [online], [retrieved on Mar. 6, 2024]. Retrieved from the Internet <URL: https://favoritemonkey.com/product/24-inch-led-direct-wire-under-cabinet-light-3000k/>.*

"GE 12-in Plug-in LED Under Cabinet Light Bar Light." Lowes., Apr. 17, 2018 [online], [retrieved on Mar. 6, 2024]. Retrieved from the Internet <URL: https://www.lowes.com/pd/GE-GE-Fixture-LED-12in-Convertible-Linkable-Hi-Low-Off-3000K-90-CRI/1003002676>.*

"Genlamp Warm White Linkable LED Strip Light 300mm." Bourne Superstore., Sep. 30, 2019 [online], [retrieved on Mar. 6, 2024]. Retrieved from the Internet <URL: https://www.bournesuperstore.com.au/warm-white-linkable-led-strip-light-300mm>.*

"Under Cabinet Lighting Rechargeable,Motion Sensor Closet Lights,Usb Rechargeable Dimmable Closet Light Night Light Bar,for Kitchen." Amazon., Apr. 26, 2021 [online], [retrieved on Mar. 6, 2024]. Retrieved from the Internet <URL: https://www.amazon.ae/Cabinet-Lighting-Rechargeable-Dimmable-Kitchen/dp/B093H13XG6>.*

"EVERDOSS Under Cabinet Lights Motion Sensor Light Indoor,30 LED Under Cabinet Lighting,Wireless USB . . . 6 Pack Warm Light." Amazon., Sep. 22, 2022 [online], [retrieved on Mar. 6, 2024]. Retrieved from the Internet <URL: https://www.amazon.com/EVERDOSS-Wireless-Rechargeable-Magnetic-Anywhere/dp/B0B8Y75DRT?th=1>.*

"Svarog Closet Lights,340 Lumens Under Cabinet Lights Wireless 19.49" Detachable Battery Motion Sensor Light Indoor Dimming Magnetic Night Light for Cupboard,Kitchen, Bedroom,Wardrobe,Hallway." Amazon., Oct. 1, 2022 [online], [retrieved on Mar. 6, 2024]. Retrieved from the Internet <URL: https://www.amazon.com/Svarog-Rechargeable-Wireless-Dimmable-Magnetic/dp/B09H2LRZDD?th=1>.*

[No Author Listed] Moston 3 Pack Upgraded USB Rechargeable 10 LED Magnetic Motion Sensor Night Light,Dusk to Dawn Photocell,Auto On/Off.Portable,Cordless,Stick-on Anywhere for Cabinet,Closet,Wardrobe(Silver). Amazon.com. https://www.amazon.co.uk/Upgraded-Rechargeable-Magnetic-Photocell-Off-Portable/dp/B06XPD3BP2/ref=sr_1_1_?crid=65KGXT8S942K&keywords=B06XPD3BP2&qid=1680180897&sprefix=b06xpd3bp2%2Caps%2C170&sr=8-1. Oct. 21, 2017:1-5.

amzon.co.uk: Moston 3 Pack Upgraded USB Rechargeable Light. Date uploaded Mar. 16, 2017 [site visited Sep. 11, 2020]. Retrived from internet, <https://www.amazon.co.uk/Upgraded-Rechargeable-Magnetic-Photocell-Off-Portable/dp/B06XPD3BP2/ref=sr_1_1_sspa . . . >(Year: 2017).*

* cited by examiner

*Primary Examiner* — Darlington Ly
(74) *Attorney, Agent, or Firm* — Wolf, Greenfield & Sacks, P.C.

(57) CLAIM

The ornamental design for a magnetic lamp, as shown and described.

DESCRIPTION

FIG. 1 is a front elevational view of a magnetic lamp showing my new design;
FIG. 2 is a rear elevational view thereof;
FIG. 3 is a left side *elevational* view thereof;
FIG. 4 is a right side *elevational* view thereof;
FIG. 5 is an enlarged top plan view thereof;
FIG. 6 is an enlarged bottom plan view thereof; [and,]
FIG. 7 is a perspective view thereof[.]*;*
FIG. 8 is a front elevational view of a magnetic lamp showing my new design in accordance to another embodiment;
*FIG. 9 is a rear elevational view of the magnetic lamp of FIG. 8;*
*FIG. 10 is a left side elevational view of the magnetic lamp of FIG. 8;*
*FIG. 11 is a right side elevational view of the magnetic lamp of FIG. 8;*
*FIG. 12 is an enlarged top plan view of the magnetic lamp of FIG. 8;*
*FIG. 13 is an enlarged bottom plan view of the magnetic lamp of FIG. 8; and,*
*FIG. 14 is a perspective view of the magnetic lamp of FIG. 8.*
Throughout the drawings the broken lines depict portions of the magnetic lamp that form no part of the claimed design.

1 Claim, 14 Drawing Sheets

Figure 1:
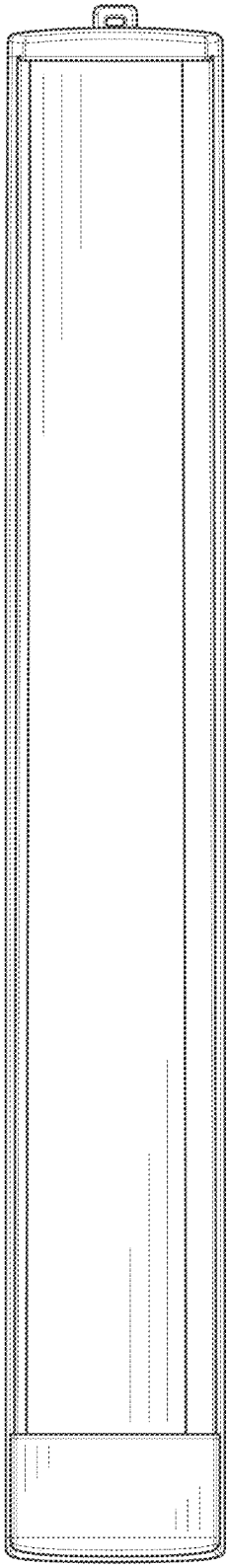
Figure 2:
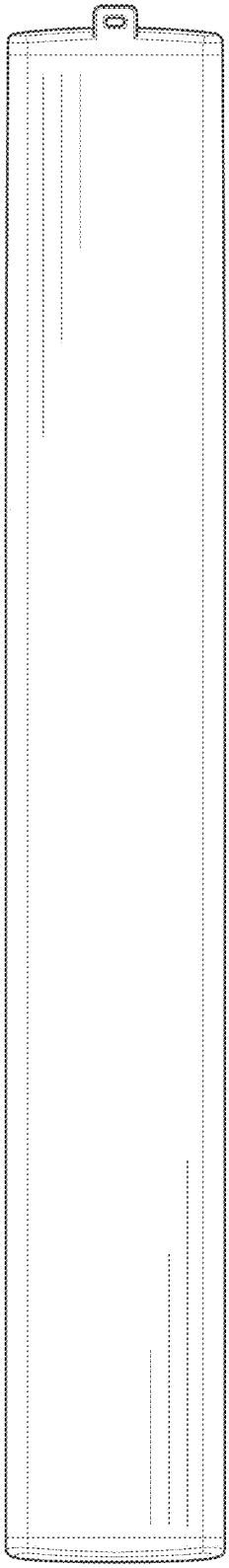
Figure 3:
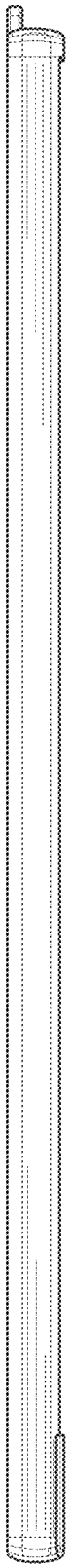
Figure 4:
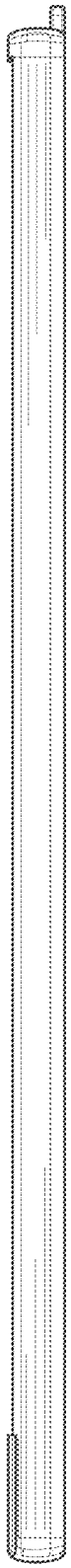
Figure 5:
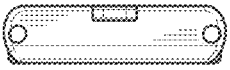
Figure 6:
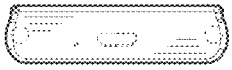
Figure 7:
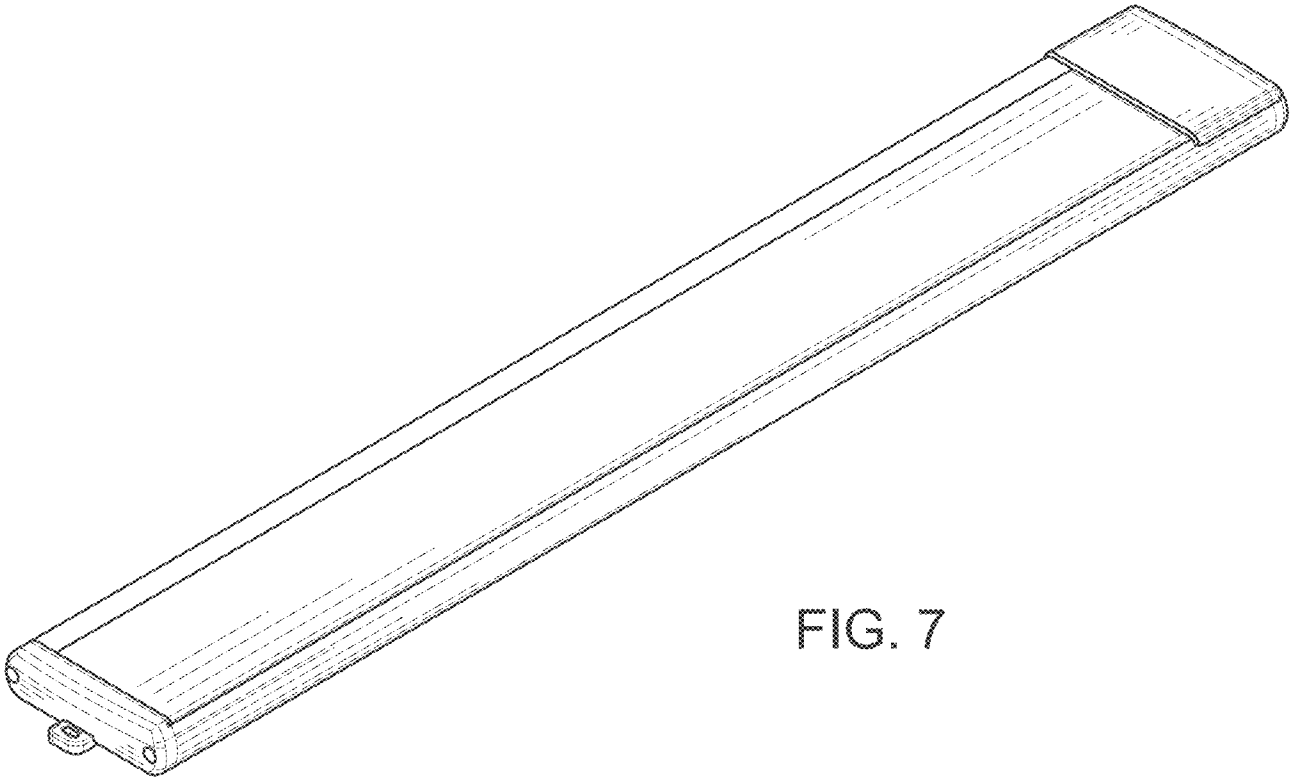

Matter enclosed in heavy brackets [ ] appears in the original patent but forms no part of this reissue; matter printed in italics indicates the additions made by reissue.

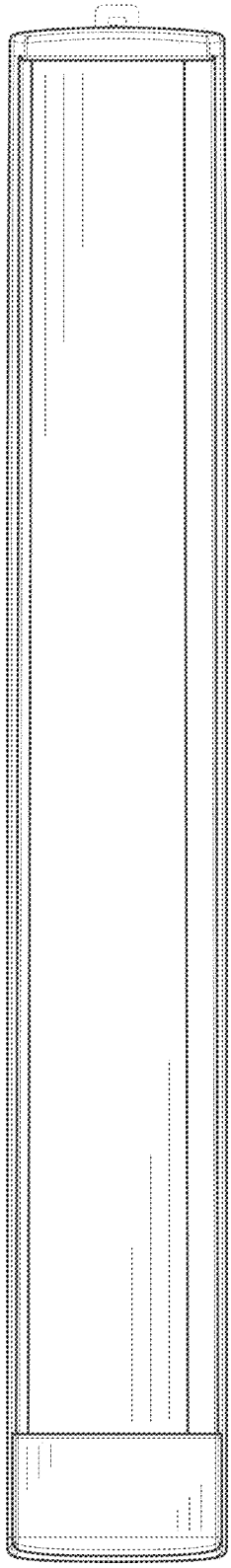
FIG. 8
(New)

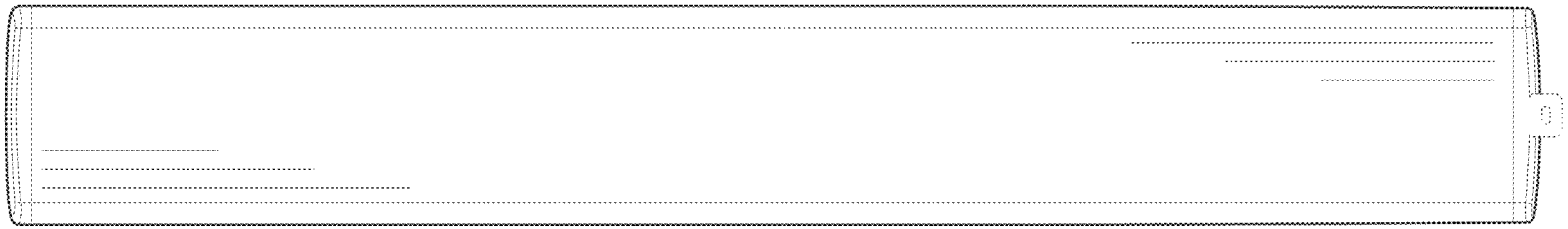
FIG. 9
(New)

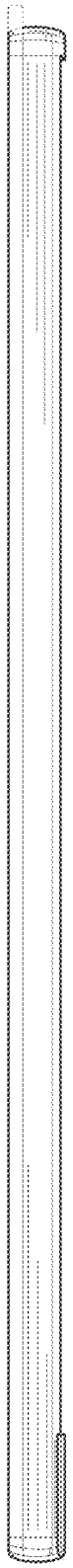
FIG. 10
(New)

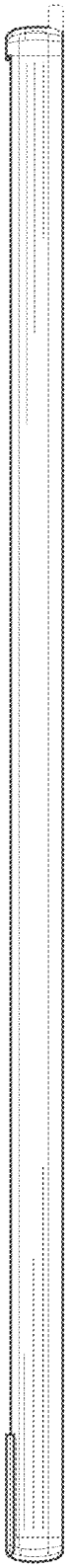
FIG. 11
(New)

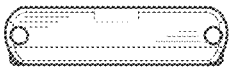
FIG. 12
(New)

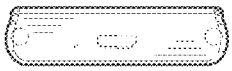
FIG. 13
(New)

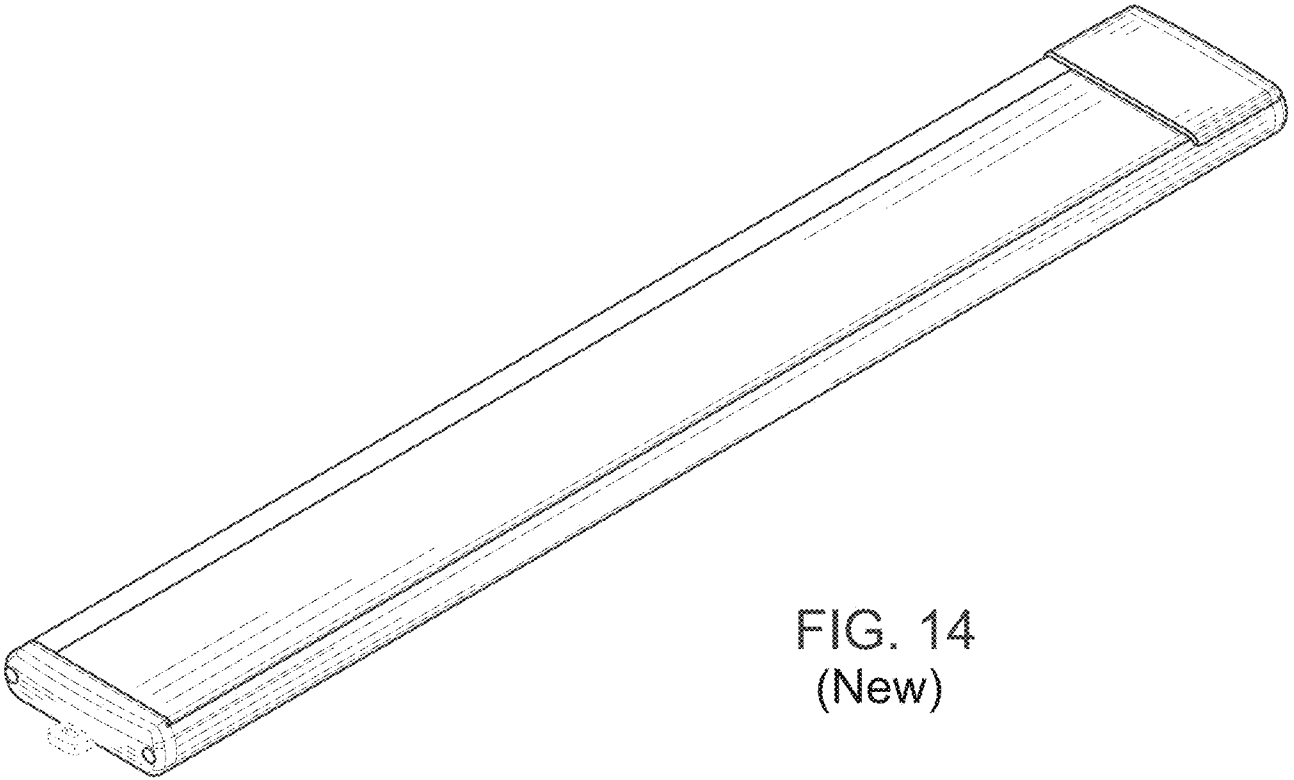
FIG. 14
(New)